United States Patent [19]

Debliek

[11] 3,902,943
[45] Sept. 2, 1975

[54] METHOD AND APPARATUS FOR JOINING PLASTIC ELEMENTS

[75] Inventor: John Debliek, Midland, Mich.

[73] Assignee: The Dow Chemical Company, Midland, Mich.

[22] Filed: Aug. 19, 1974

[21] Appl. No.: 498,481

[52] U.S. Cl. ............... 156/157; 156/304; 156/306; 156/322; 156/499; 156/502; 156/535; 264/248
[51] Int. Cl.² ........................................ B65H 69/00
[58] Field of Search .......... 156/157, 304, 306, 322, 156/499, 535, 581, 502; 161/121; 264/248, 249

[56] References Cited
UNITED STATES PATENTS

| | | |
|---|---|---|
| 3,635,280 | 1/1972 | Parsons .............................. 156/304 |
| 3,790,427 | 2/1974 | Marstrand ........................... 156/304 |
| 3,853,655 | 12/1974 | Peche ................................ 156/306 |
| 3,855,038 | 12/1974 | Anschutz ........................... 156/304 |

Primary Examiner—William A. Powell
Assistant Examiner—Brian J. Leitten
Attorney, Agent, or Firm—Robert B. Ingraham

[57] ABSTRACT

An elongate thermoplastic foam strip is butt welded employing a corrugated heating platen having two opposed generally parallel sides, each side having defined thereon a plurality of corrugations wherein the peaks and troughs are opposed. Foam elements are pressed against the heated platen to heat a portion of the thermoplastic foam and the elements pressed together after the platen is removed and the foam elements cooled below their thermoplastic temperature.

4 Claims, 5 Drawing Figures

METHOD AND APPARATUS FOR JOINING PLASTIC ELEMENTS

Oftentimes it is desirable to butt weld elongate strips or planks of thermoplastic synthetic resinous foam to form long continuous strips. Such strips are frequently employed in the fabrication of structures by the socalled "spiral generation" process. Such a process is shown in U.S. Pat. No. 3,206,899. In some instances it has been attempted to prepare a better buttweld employing a tongue and groove configuration on the end portions, however, such an approach results in a substantial loss of material.

It would be desirable if there were available an improved method for the butt welding of thermoplastic synthetic resinous foam elements.

It would also be desirable if there were available an improved method for the joining of synthetic resinous thermoplastic elements which provides a reliable high strength joint.

It would further be desirable if there were available a method of joining synthetic resinous elongate elements in such a manner that the joint was self-centering in at least one plane.

It would also be desirable if there were available a method and apparatus for joining synthetic resinous thermoplastic foam elements in such a manner that a joint of high strength is obtained with the deformation or destruction of a minimal amount of the foamed synthetic resinous element.

These benefits and other advantages are of the present invention and are achieved in a method for the butt welding of two elongate synthetic resinous thermoplastic foam elements, the method comprising providing a first foam element having an end to be joined and second foamed element having an end to be joined, disposing between the ends to be joined a platen, the platen having first and second generally parallel surfaces each of the parallel surfaces having a corrugated configuration wherein the corrugation of the first and second surfaces are generally parallel and of generally similar dimension and frequency, the platen being at a temperature sufficient to cause softening of the foam when the foam is contacted therewith, contacting the ends of the foam with the platen to form a generally mating corrugated surface on the adjacent ends, removing the platen from between the ends and thereby exposing heat plastified synthetic resinous collapsed foam, contacting the adjacent ends and reducing the temperature of the heat collapsed foam below the thermoplastic temperature.

Also contemplated within the scope of the present invention is an apparatus for the welding of foam bodies. The apparatus comprising means to support a first foam body having a surface to be joined, means to support a second foam body having a surface to be joined, the means for supporting the first and means to support the second by being so constructed and arranged so that bodies are positioned thereon in such a manner that surfaces to be joined are generally parallel, a platen having a first face and a second face, the first face and the second face being generally parallel, each of the faces defining a plurality of corrugations, the corrugations being generally of like dimension and like frequency, peaks and troughs of the corrugations on the first face being displaced from those on the second face by about 180°, means to heat said platen to a temperature sufficiently high to heat plastify synthetic resinous thermoplastic material, means to selectively position said platen between faces of foam bodies to be joined and to withdraw the platen therefrom.

Further features and advantages of the present invention will become more apparent from the following specification taken in connection with the drawing wherein.

Figure 1:
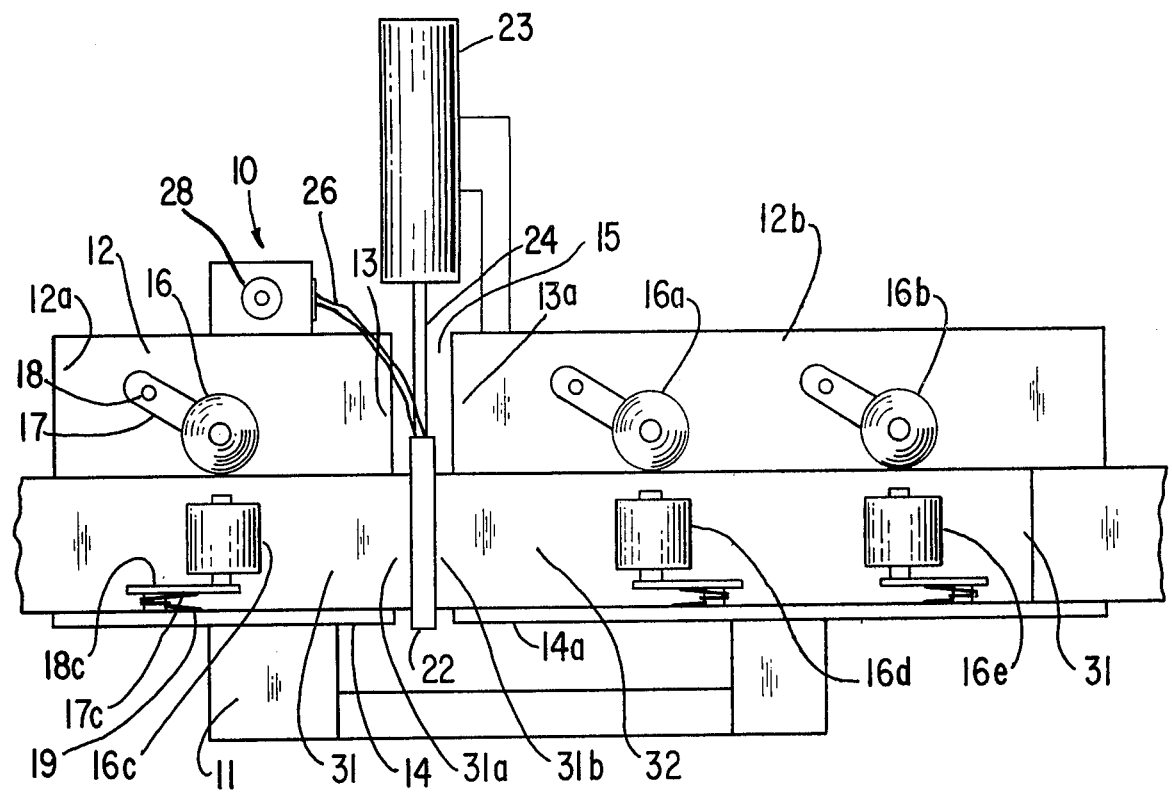
FIG. 1 is a schematic representation of a heat-sealing apparatus in accordance with the invention.

In FIG. 1 there is depicted a heat-welding or sealing apparatus in accordance with the present invention generally designated by the reference numeral 10. The apparatus 10 comprises in cooperative combination a frame 11. The frame 11 has affixed thereto a first work piece support 12 and a second work piece support 13. The work piece support 12 has a first portion 12a and a second portion 12b. The portions 12a and 12b each have an L-shaped configuration and are separated from each other by a space 15. The work support portions 12a and 12b have vertically extending generally planar elements 13 and 13a which are generally co-planar. A second pair of planar elements 14 and 14a are disposed generally adjacent the elements 13 and 13a and are disposed in a plane generally normal thereto and are affixed to the elements 13 and 13a respectively. The work piece support 12 generally defines an L-shaped channel which is separated by the space 15. The work piece support 12 has a first series of resiliently tensioned rolls 16, 16a and 16b. The roll 16 is rotatably mounted on an arm 17. The arm 17 is in turn pivotally affixed to the planar element 13 by means of a pivot 18. The roll 16 rotates about an axis which is generally parallel to the planar element 14 and perpendicular to the element 13. A similar roll 16c is affixed generally adjacent roll 16 by an arm 17c mounted on a pivot 18c and resiliently tensioned toward the element 13 by means of a resiliently tensioning member or spring 19. Similar rolls 16d and 16e are mounted on an element 14a generally adjacent rolls 16a and 16b, respectively. A heating platen 22 is supported by means of a linear actuator 23 having a reciprocating shaft 24 generally within the space between the work piece support portions 12a and 12b. The linear actuator 23 such as a pneumatic cylinder or hydraulic cylinder moves the platen 22 selectively within the space 15 adjacent the elements 14 or 14a or alternately withdraws it therefrom. The platen 22 is disposed in a plane generally normal to planes containing the work support elements 13, 14, 13a and 14a. The platen 22 has an energy source 26 connected thereto to provide heat to the platen 22. Beneficially the heat source 26 may be a source of electrical current, heated oil or other heat transfer fluid. The source of heat energy 26 is connected to a temperature control means 28 which beneficially controls the temperature of the platen 15. A first work piece 31 is disposed in the work piece hold portion 12a. A second work piece 32 is held in the work piece portion 12b. The first work piece portion 31 is resiliently tensioned toward the element 13 by the roll 16c and toward the element 14 by the roll 16. In similar manner the work piece 32 is positioned towards support member 14a by the rolls 16a and 16b and toward the portion 13a by the rolls 16b and 16c. The work pieces 31 and 32 have adjacent generally parellel ends 31a and 31b which are to be joined together by heat-sealing. In the work piece 32 is depicted a seal or joint 33 which has been made by means of the platen 22.

In operation of the apparatus as depicted in FIG. 1, a work piece such as the work piece 32 is positioned on the work piece support portion 12b with an end such as the end 31b projecting slightly into the space 15. A similar work piece 31 is provided with the end 31a projecting slightly into the space 15. The platen 22 is heated to a temperature sufficient to heat-plastify the material of the work piece such as synthetic resinous thermoplastic foam. The platen is then positioned between adjacent ends of the work pieces to be joined by means of a linear actuator 23. The ends 31a and 31b of the work pieces are forced into the platen to a depth sufficient that a generally continuous layer of heat softened collapsed thermoplastic foam covers each of the end surfaces. When sufficient heating and collapse of the foam has taken place, the platen 22 is removed and the ends 31a and 31b are pressed together and the heat plastified collapsed foam permitted to cool below its heat-plastifying temperature to form a bond or heat seal.

Figure 2:
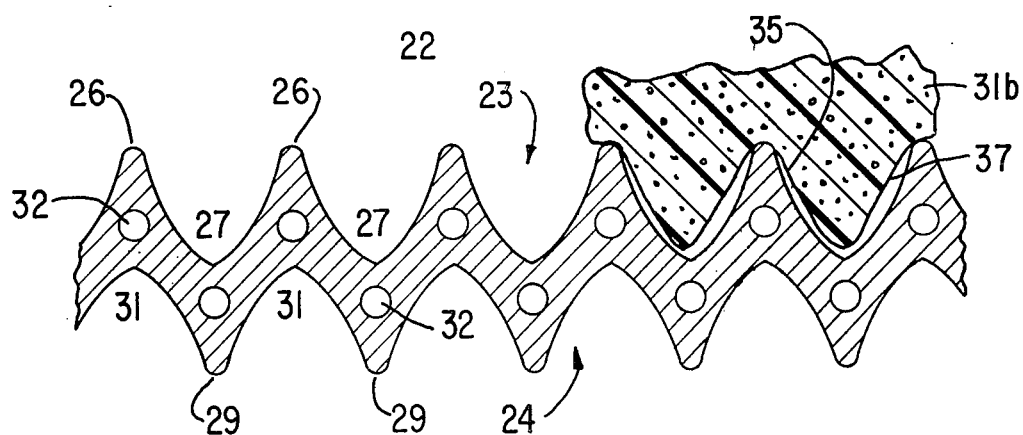
FIG. 2 is a fractional section view through the platen of FIG. 1 taken along the line 2—2 thereof.

In FIG. 2 there is depicted a fractional schematic representation of a section of the platen 22 of FIG. 1 taken along the line 2—2 thereof. The platen 22 has a first side 23 and a second side 24. The sides 23 and 24 are in generally parallel relationship. Side 23 finds a plurality of corrugation having peaks 26 and troughs 27. The platen 22, in regions lying between the peaks 26 and extending into the troughs 27, has arcuate concave sides. Peaks 26 have a generally arcuate configuration. The side 24 defines a plurality of peaks 29 and a plurality of troughs 31 of generally like configuration to those of the first side 23. The troughs 31 of the side 24 are interdigitated with the troughs 27 of the side 23. A plurality of heating means 32 are shown. The heating means 32 beneficially are electrical resistance heaters or alternatively as desired, heat exchange passages through which a heat exchange fluid may be passed. Adjacent a portion of the surface 23 is a portion of end 31b of the work piece 32 showing a corresponding corrugation 35 formed in the surface thereof. On the surface of the corrugations 35 is a layer of heat-plastified collapsed foam 37. The configuration of the corrugations 35 does not correspond to the configuration of the corrugations 23 of the platen 22. When initially heated the platen attains a relatively uniform temperature. Beneficially, such platens are prepared from a metal having a high thermalconductivity such as copper or aluminum. On contact of the platen 22 with the work piece, such as the work piece 32, a greater quantity of foam or thermoplastic material is melted in the region of the peak 26 then in the region of the trough 27. Most thermoplastic foams of a density generally used for thermal insulation, such as polystyrene foam will tend to collapse and shrink away from a hot surface. By the term "hot surface" is meant the surface of a body having a temperature sufficiently high to cause heat collapse of the foam when the foam is contacted with the body or the body is disposed in closely adjacent relationship thereto. In the embodiment as depicted in FIG. 2, the concave side of the troughs 27 result in a melted shape of the thermoplastic foam body which approximates a saw tooth configuration, thus when the platen 22 has heated the ends 31a and 31b to a sufficient extent to obtain the configuration as depicted in FIG. 2, the platen is then removed and the two ends are forced together. Minor deviation of the ends 31a and 31b from a mating configuration, is generally of no importance when the ends are forced together as there is usually a substantial layer of heat-plastified collapsed foam on each of the surfaces which will move sufficiently to provide continuous or almost continuous contact between the two work pieces and form an exceptionally strong and reliable heat-bond or seal. Beneficially, platens such as the platen 22 are readily prepared by milling a plurality of parallel grooves on opposite faces of a suitable metal plate. For most purposes, where non-corrosive synthetic resinous foams are employed, copper or aluminum is particularly suitable. If corrosive conditions are encountered, oftentimes a coating of polytetrafluoroethylene is beneficial and if especially corrosive, plating with nickel and chromium is desirable.

For many applications it is desirable to employ electrical resistance heating because of the ease of control of temperature. In some instances very adequate heating is obtained by providing opposed gas flames which are held adjacent the platen when withdrawn from the space 15 and the elements 14 and 14a. The platen configuration depicted in FIG. 2 provides an excellent reliable joint in synthetic resinous thermoplastic foams when employed in apparatus such as depicted in FIG. 1.

Figure 3:
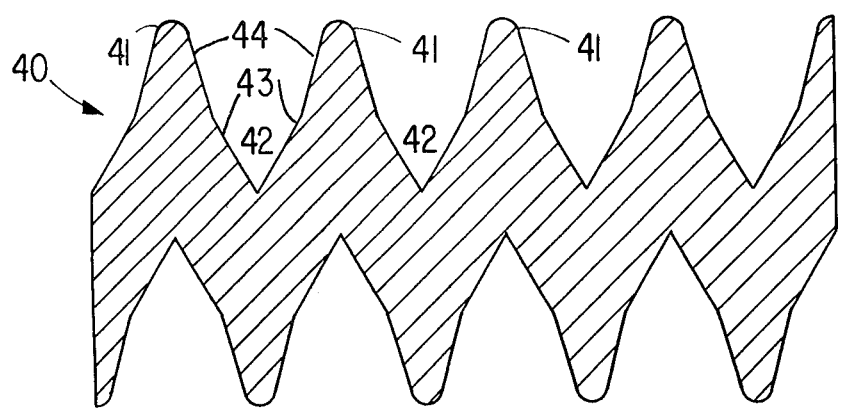
FIGS. 3, 4 and 5 are alternate platen configurations useful in the practice of the present invention.

In FIG. 3 there is schematically depicted an alternate platen suitable for use in the method and apparatus of the invention generally designated by the reference numeral 40. The platen 40 has generally parallel faces such as the platen of FIG. 2 and linear corrugations which extend for at least a major portion of the face thereof. Each face of platen 40 defines a plurality of peaks 41 and a plurality of troughs 42. Each side of the troughs 42 comprises a lower panel portion 43 and an upper panel portion 44 which approximates the actuate configuration of the sides of the troughs 27 in the embodiment of FIG. 2. The embodiment of FIG. 3 is slightly inferior to the embodiment set forth in FIG. 2 in the heat-sealing characteristics. The shape of the corrugations formed in the ends of the work piece do not mate quite as well as those obtained in the embodiment of FIG. 2 however, the corrugation configuration of FIG. 3 is more easily prepared than that of FIG. 2.

Figure 4:
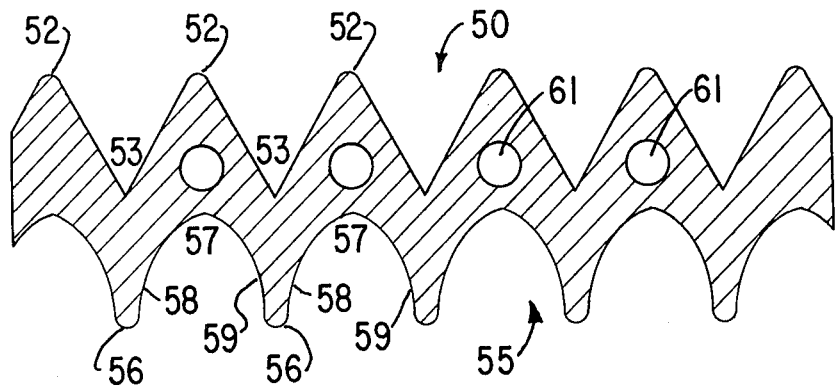

In FIG. 4 there is schematically depicted an alternate platen for the practice of the present invention generally designated by the reference numeral 50. The platen 50 has a first side 51 defining a plurality of peaks 52 and a plurality of troughs 53. The troughs 53 are of V-shaped configuration and have an included angle of about 60°. The platen 50 has a second side 55 which defines a plurality of peaks 56. Peaks 56 has disposed therebetween a plurality of troughs 57. The troughs 57 are each defined by two opposed arcuate surfaces 58 and 59 having a radius of curvature substantially less than that of the surfaces defining the troughs 27 of FIG. 2. A platen of the configuration as defined in FIG. 4 provides a bond between adjacent portions of foam generally equivalent of that of the embodiment depicted in FIG. 3 and permits the use of larger heat exchange opening such as heat exchange openings 61 shown therein.

Figure 5:
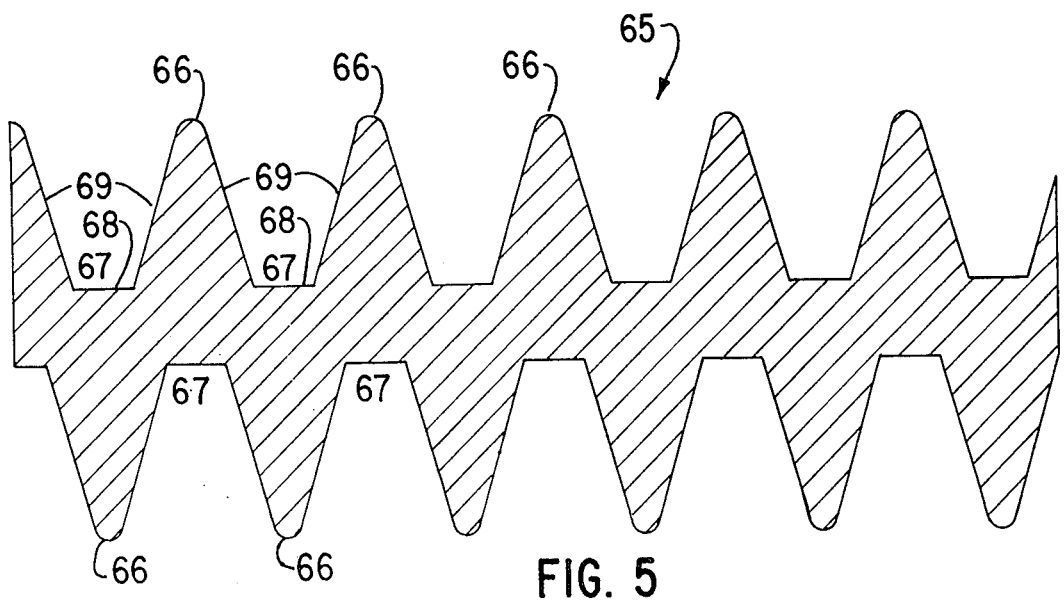

In FIG. 5 there is depicted an alternate platen suitable for the practice of the invention generally designated by the reference numeral 65. The platen 65 has corrugations in the surface thereof generally as the platens of FIGS. 2, 3 and 4 and has a plurality of convex peaks 66. The peaks 66 are separated by a plurality of troughs 67. Troughs 67 are defined by a bottom surface 68 which is generally parallel to the major surface of the platen and surfaces 69 which are outwardly diverging from the bottom surface 68 toward the peaks 66. The embodiment of 65 has a particular advantage in that it is more readily machined with simpler tools than in the embodiments of FIGS. 2–4.

The apparatus employing platens in accordance with the present invention has been successfully used to join polystyrene foam joints of highly reliability and high strength. Similarly beneficial results are obtained when other thermoplastic synthetic resinous foams are employed.

What is claimed is:

1. A method for the butt welding of two elongate synthetic resinous thermoplastic foam elements, the method comprising, providing a first foam element having an end to be joined and second foamed element having an end to be joined, disposing between the ends to be joined a platen, the platen having first and second generally parallel surfaces each of the parallel surfaces having a corrugated configuration wherein the corrugation of the first and second surfaces are generally parallel and of generally similar dimension and frequency, the platen being at a temperature sufficient to cause softening of the foam when the foam is contacted therewith, contacting the ends of the foam with the platen to form a generally mating corrugated surface on the adjacent ends, removing the platen from between the ends and thereby exposing heat plastified synthetic resinous collapsed foam, contacting the adjacent ends and reducing the temperature of the heat collapsed foam below the thermoplastic temperature.

2. The method of claim 1 with the further limitation that the grooves of the corrugations have generally concave arcuate sides.

3. An apparatus for the welding of foam bodies, the apparatus comprising, means to support a first foam body having a surface to be joined, means to support a second foam body having a surface to be joined, the means for supporting the first and means to support the second by being so constructed and arranged so that bodies are positioned thereon in such a manner that surfaces to be joined are generally parallel, a platen having a first face and a second face, the first face and the second face being generally parallel, each of the faces defining a plurality of corrugations, the corrugations being generally of like dimension and like frequency, peaks and troughs of the corrugations on the first face being displaced from those on the second face by about 180°, means to heat said platen to a temperature sufficiently high to heat plastify synthetic resinous thermoplastic material, and means to selectively position said platen between faces of foam bodies to be joined and to withdraw the platen therefrom.

4. The apparatus of claim 3 with the further limitation that the grooves of the corrugations have generally concave arcuate sides.

* * * * *